United States Patent [19]

Hill

[11] Patent Number: 6,023,703

[45] Date of Patent: Feb. 8, 2000

[54] METHOD AND SYSTEM FOR REPRESENTING HIERARCHICAL TIME-BASED DATA STRUCTURES AND TO EXTRACT INFORMATION THEREFROM

[75] Inventor: Raymond Hill, Montreal, Canada

[73] Assignee: Avid Technology, Inc., Tewksbury, Mass.

[21] Appl. No.: 09/316,949

[22] Filed: May 24, 1999

Related U.S. Application Data

[62] Division of application No. 08/847,536, Apr. 15, 1997, Pat. No. 5,930,797.

[51] Int. Cl.$^7$ .................................................. G06F 17/30
[52] U.S. Cl. ........................ 707/100; 345/302; 345/335; 707/101
[58] Field of Search ................................... 707/100, 101; 345/302, 335

[56] References Cited

U.S. PATENT DOCUMENTS

| | | | |
|---|---|---|---|
| 5,659,793 | 8/1997 | Escobar et al. | 345/302 |
| 5,826,102 | 10/1998 | Escobar et al. | 345/302 |
| 5,930,797 | 7/1999 | Hill | 707/101 |

*Primary Examiner*—Paul R. Lintz
*Assistant Examiner*—Jean Bolte Fleurantin
*Attorney, Agent, or Firm*—Robert P. Stratton; Omar A. Nassif; Arne I. Fors

[57] ABSTRACT

A method and system for representing hierarchical time-based data structures and to extract information therefrom comprises means to create a container, the container having one or more layers within which data elements are arranged along the container axis and to examine the container to produce virtual static graphs which represent active data elements and their interconnections within time durations represented within the container. The data elements in the container can change between active and inactive states with time and the connections between data elements can also change with time and the container represents this information. A set of constraints is defined for the container such that interconnections between data elements only occur between data elements in different layers. Specifically, a data element can only receive input from one or more other data elements which are in lower levels and a data element can only provide output to one or more data elements which are in higher levels. Transitions in a lower layer, representing changes in the active status of a data element, are propagated to each higher layer, such that a higher layer can never have less transitions that a lower layer. Each layer includes a record of which data element outputs are available in the layer at all times. When a request for information relating to the active data elements and their interconnections within a specified time period is received, the container is examined to produce a virtual static graph representing the minimal set of active data elements and their interconnections with the specified time.

7 Claims, 10 Drawing Sheets

METHOD AND SYSTEM FOR REPRESENTING HIERARCHICAL TIME-BASED DATA STRUCTURES AND TO EXTRACT INFORMATION THEREFROM

This application is a Div. of Ser. No. 08/847,536 filed Apr. 15, 1997, now U.S. Pat. No. 5,930,797

FIELD OF THE INVENTION

The present invention relates to a method and system of representing unidirectional data structures and extracting sets of data elements from such representations. More specifically, the present invention relates to a method and system for extracting minimal sets of active data elements and their interconnections from hierarchical, unidirectional data structures such as time line-based data from nonlinear editors and the like.

BACKGROUND OF THE INVENTION

Hierarchical, unidirectional data structures are known and are commonly used to represent a variety of data. Such data structures can also be used to represent data elements with respect to a first axis, commonly a time axis, and wherein the data elements also have inter-relationships between themselves, such as child-parent hierarchies, etc.

One use for such data structures is to store time-based hierarchical data, such as the edits produced with a non-linear editor (NLE). In an NLE, data elements such as media sources, effects and filters are represented by objects which can be positioned and manipulated relative to a common time-based axis, or time line. Each data source can be represented by a clip object that has a duration which can be positioned relative to the time axis and is active (i.e.— generating an output) for all or a portion of that duration according to a time mask applied to the clip object by a user. The output of the source clip object can be a final output from the NLE or can be the input to another object in the NLE, such as a filter object or an effect object.

For example, a user may desire that a ten second portion of video information be output from a digital video stream with a total duration of forty seconds. The requested portion can be located from the tenth to the nineteenth second of the forty second video stream and it is desired to have that output at the thirty second point in the edit being produced, i.e. thirty seconds of some other output occurs and then ten seconds of this output. In such a case, the digital video stream can be represented within the NLE as a video source clip with a duration of forty seconds and is positioned by the user, with respect to a defined global time axis, such that the desired duration of the video source clip (ten to nineteen seconds) commences at the thirty second point on the global time line, i.e. the beginning of the clip is located at the twenty second point of the global timeline. The user then places a time mask along the appropriate portion of the clip (i.e. from thirty to thirty nine seconds relative to the global time line), activating the clip to output the requested duration of ten seconds, at the desired time. For the portions of the clip before and after the active duration, as indicated by the applied time mask, the clip is inactive and produces no output, although this can be subsequently changed by the user by adding additional time masks and/or changing the existing time mask.

In addition to being active or inactive, as mentioned above an object can be either the child or parent of another object. For example, the above mentioned video clip can be the child of a dissolve effect object and, in such a case, the output of the video clip is supplied to an input of the dissolve effect object for the specified duration and the dissolve effect processes the output from the video source clip and another video source clip to create an output comprising the desired dissolve effect between those clips. Also, an object can be the parent of another clip. For example, the dissolve effect object is the parent of the video clip described above.

In addition to the time-based change between active and inactive states, the hierarchical relationships between data elements can also change with time. For example, a thirty second video clip can be active and have no parent for a time t=0 to t=9 (i.e.—the output of the clip is output directly) and can be a child of a dissolve effect for a time t=10 to time t=19 (i.e.—the output of the clip is an input to a dissolve function) and can then be inactive for time t=20 onwards. In such a case, the parent-child relationships within the hierarchy of the NLE change with time.

It is believed that, in the past, hierarchical unidirectional data structures such as NLE edits have been represented as graph structures which represent the hierarchical relationships between data elements. When it was desired to produce a portion of an edit, the graph structure would be walked, visiting each data element in the graph. Each visited data element would then be required to specify whether it was active or inactive within the desired time portion of the edit, which (if any) of its one or more output connections is active and which other data elements are supplying it with input or inputs.

As an NLE edit can be very complex, consisting of many source data clips, effects objects and filter objects, such a graph can be very deep and performing a walk of such a graph can be computationally expensive to implement. Further, such a structure requires that each data element maintain its own list of when it is active and/or its hierarchical relationships with other data elements and this can make constructing and/or updating such a graph structure to reflect changes in the NLE a complex and computationally expensive operation to perform.

It is desired to have a novel method and system of representing and using hierarchical, unidirectional data structures such as NLE edits and the like which is relatively efficient to implement and which allows the data structures to be created and/or updated in a flexible manner.

SUMMARY OF THE INVENTION

It is an object of the present invention to provide a novel method and system of representing and processing hierarchical, unidirectional data structures which obviates or mitigates at least one of the disadvantages of the prior art.

According to a first aspect of the present invention, there is provided a method of representing hierarchical time-based data elements wherein data elements can change between active and inactive states with time and wherein interconnections between said data elements can also change with time and extracting information from specified time portions thereof, comprising the steps of:

(i) determining the data elements to be represented;

(ii) creating a container to represent the states and hierarchy of said data elements;

(iii) placing each data element which receives no input from other data elements in a first, bottom layer of said container, and positioning each said data element with respect to a time line and indicating when each said data element is active and inactive;

(iv) creating a minimal set of one or more higher layers in which other data elements to be represented are placed, indicating when each said other data elements are active and inactive, said other data elements being placed such that they receive input only from data elements in a lower layer and that, if they provide an output to other data elements, those data elements are located in a higher layer;

(v) for each layer in turn in said container, from the bottom layer to the top layer, examining the data elements in the layer to determine the transitions wherein each data element in the layer and in any adjacent lower layer changes between states;

(vi) creating for each layer a layer multiplexer to indicate each output from a data element which is available in each duration between determined transitions;

(vii) examining the top layer of said container to determine for each duration in said container to identify the outputs required for each duration and the data elements which provide said identified outputs;

(viii) for each data element which requires input from another data element, examining the layer multiplexers in lower layers to determine the other data elements which provide the required input; and (ix) in response to a request for active data elements and their interconnections within a specified portion of time represented within said container, outputting a representation of said active data elements a representation of their interconnections for each duration within said portion of time.

According to another aspect of the present invention, there is provided a system for representing hierarchical time-based data elements whose state can change between active and inactive states with time and wherein interconnections between said data elements can also change with time and for extracting information from specified time portions thereof, comprising:

a container having one or more layers, each layer being arranged in a hierarchy;

a database for each layer of said container, each said database including an indication the time of each state transition within a corresponding layer and an immediately adjacent lower layer in said hierarchy;

means to represent data elements within said layers of said container such that each data element which is to receive data from a second data element is represented in a higher layer than that of said second data element and each data element which is to provide an output to a second data element is in a lower layer than that of said second data element;

means to examine said container to determine those data elements which are in an active state for a requested time portion and their interconnections within said requested time portion; and means to output a representation of the determined data elements and their interconnections.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

As is known, NLE edits can include one or more tracks. For example, an edit representing a television commercial can include a video track, a left audio track and a right audio track. A representation of an edit track created within a non-linear editing system in accordance with the present invention is shown generally at 20 in FIG. 1. Edit track 20 includes two data source clips, identified as S1 and S2 in a first layer L0 and in a second layer L1 includes two filters, identified as F1 and F2 and a dissolve effect identified as E1. In the case wherein edit track 20 is a video track, sources S1 and S2 can be digital video data, in one of a variety of formats.

Figure 1:
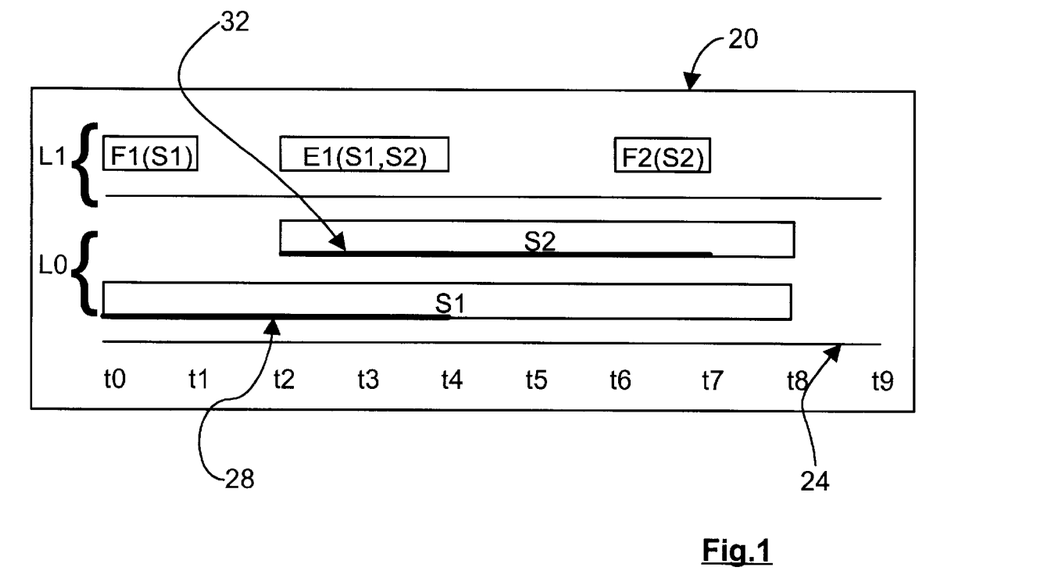
FIG. 1 shows an edit track in a nonlinear editing system.

In FIG. 1, source clip S1 has a total duration of eight seconds and is positioned from time t0 to t8 relative to the global time line 24 of edit 20. A time mask 28 (indicated in the Figure by a black bar) has been applied to source clip S1 to make it active for four seconds, specifically from t0 to t4.

In the prior art of which the inventor is aware, the activity of a clip was represented solely by its presence or absence in the NLE edit. For example, if a clip was shown as being five seconds long, it was active for five seconds. To make it active for a longer time period required "stretching" the clip, for example to seven seconds in length, and similarly, reducing the time it was active required "clipping" the clip, for example to three seconds in length. In contrast, in the present invention a time mask is used to activate a portion or portions of a clip.

In FIG. 1, source clip S2 has a total duration of six seconds and is positioned from time t2 to t8 of time line 24. A time mask 32 has been applied to source clip S2 to make it active from t2 to t7.

Filter object F1 acts on source clip S1, as indicated by the "(S1)" suffix in the Figure, from t0 to t1 and can, for example, be a fade-in which results in the output of source clip S1 fading in from black to full visibility between t0 and t1 in the output of edit track 20. Dissolve effect object E1 acts on source clips S1 and S2, as indicated by the "(S1, S2)" suffix in the Figure, from t2 to t4 and represents a dissolve from the output of clip S1 to the output of clip S2 over a two second duration. Finally, filter object F2 acts on source clip S2 from t6 to t7 and can, for example, be a fade-out effect which results in the output of source clip S2 fading from full visibility to black between t6 and t7 in the output of edit track 20.

Generally, in an NLE editor only a single output is produced at any one time for a given track. For example, a video output track and a right and a left audio output track can be created and output by an NLE edit, but two video outputs within a video track or two left audio outputs within a track will not be created and/or output at any one time. As will be apparent to those of skill in the art, the actual output on any track is determined by examining the layers of the edit, from top down. Thus, in FIG. 1, it can be determined that filter object F1 generates the output from t0 to t1, source clip S1 generates the output from t1 to t2, dissolve effect object E1 generates the output from t2 to t4, source clip S2 generates the output from t4 to t6 and filter object F2 generates the output from t6 to t7. As no object in track edit 20 is active after t7, the output ceases at that point.

When it is desired to output the result of an edit, or portion of an edit, the information representing the portion of the edit is output to the rendering system, which produces the desired output, according to the edit information. Specifically, the rendering system requires information to identify the active elements for the portion of the edit track, or tracks, to be rendered and their interconnections within the requested portion.

Figure 2:
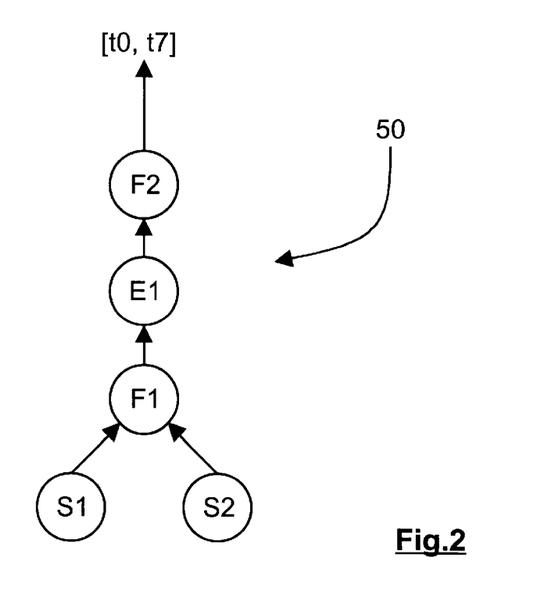
FIG. 2 shows a graph representation of the edit track of FIG. 1.

FIG. 2 shows a prior art graph 50 which can be used to represent edit track 20. In the graph each of the sources, effects and functions is represented as a data element, or node, and the data elements are arranged in a hierarchy for the entire duration of the edit track, i.e.—from t0 to t7, as shown. When it is desired to generate an output of edit track 20, the graph is walked, visiting each data element and querying the element to determine whether the data element creates an output (i.e.—is active), and at what time, and whether the data element receives input or inputs from other specified data elements and when. This information is then passed to the rendering system. As can be seen, these determinations are generally not easily made, nor is the graph easily updated to reflect changes in edit track 20 which may occur. Also, it is possible that redundant interconnections and/or data elements are presented to the rendering system, resulting in an inefficient use of the rendering system capacity.

In contrast, in the present invention one or more representations, referred to by the present inventor as virtual static graphs, are created as needed when a specified portion of an edit track is to be output. As used herein, the term virtual static graph is intended to comprise a graph, or graph-like representation, whose connections do not change with time and wherein the nodes in the graph are not duplicated, but instead the connections merely change. Specifically, in the present invention an edit track is represented within a media container which is examined to determine all the durations between transitions in the track. When it is desired to render a portion of an edit track, the media container is examined to create a representative virtual static graph or graphs which are output to the rendering hardware and/or software.

Figure 3A:
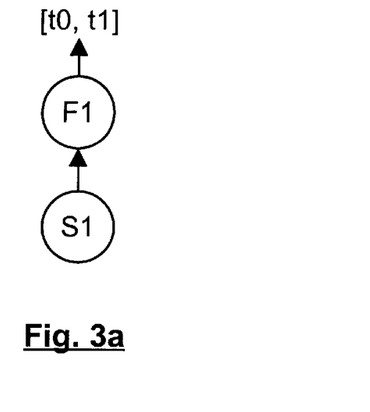
FIGS. 3a through 3e show virtual static graphs each representing one of five durations within the edit track of FIG. 1.
Figure 3B:
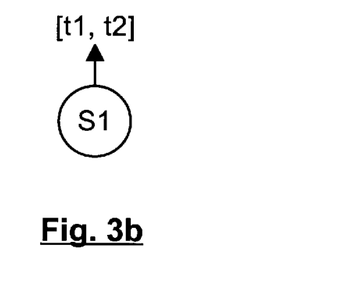
Figure 3C:
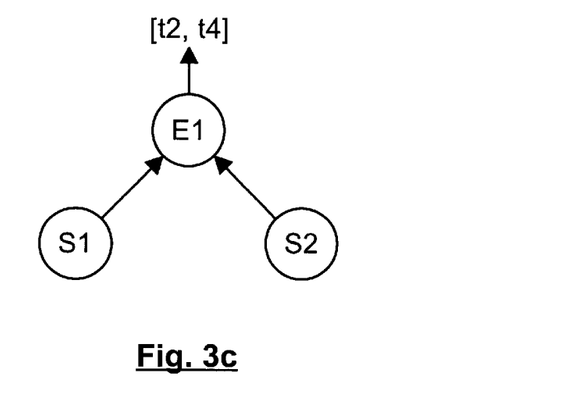
Figure 3D:
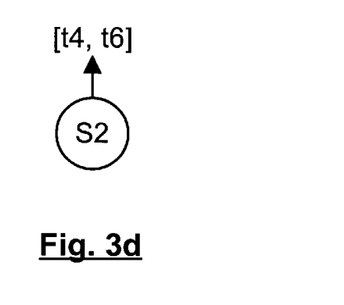
Figure 3E:
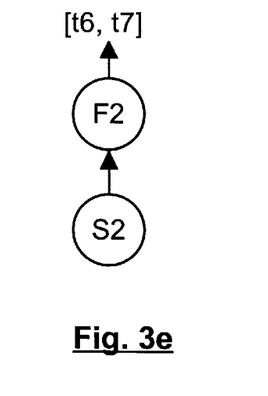

For example, edit track 20 of FIG. 1 has five durations and FIGS. 3a, 3b, 3c, 3d and 3e show virtual static graphs which are created in accordance with the present invention to represent these durations. FIG. 3a shows a virtual static graph representing the time span from t0 to t1, FIG. 3b shows a virtual static graph representing the time span from t1 to t2, FIG. 3c shows a virtual static graph representing the time span from t2 to t4, FIG. 3d shows a virtual static graph representing the time span from t4 to t6 and FIG. 3e shows a virtual static graph representing the time span from t6 to t7. Each virtual static graph represents both the active data elements and their hierarchical relationships for each duration of edit track 20 and represents the duration with only those data elements which are active within the duration and with the minimum number of connections between data elements.

As will be apparent to those of skill in the art, virtual static graphs provide a simple, yet effect technique for representing the structure of portions of an NLE edit track to the rendering system. In the present invention, a minimum set of virtual static graphs is provided in response to all requests for an output portion of the NLE edit track. This set of minimal virtual static graphs is then processed, in any suitable manner, by the rendering system to produce the desired output. For example, if a user wishes to output edit track 20 from t2 to t6, the virtual static graphs shown in FIGS. 3c and 3d are produced for the rendering system. As will be apparent to those of skill in the art, in practice the rendering system will in fact be provided with an appropriate representation of the virtual static graphs, for example as one or more data structures in a suitable format, the data structures comprising the information represented by the virtual static graphs.

The method of constructing the set of minimal virtual static graphs for a requested duration of an NLE edit track is presently implemented as described below, with reference to FIGS. 4 to 16e. As presently implemented, the construction of virtual static graphs is performed on an as-needed basis, i.e.—when it is desired to produce an output from an NLE edit track.

Figure 4:
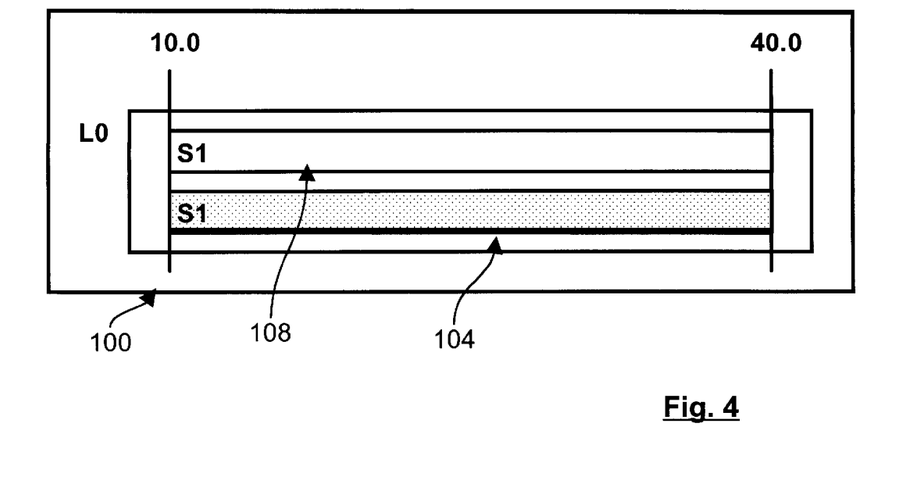
FIG. 4 shows a media container in accordance with an embodiment of the present invention, the media container including a single source.

FIG. 4 shows a representation of a media container 100 employed within the present invention. Container 100 is constructed, as required, when one or more virtual static graphs are to be output to produce a requested duration of the edit. Specifically, when one or more virtual static graphs are to be constructed for a requested portion, a container 100 is constructed and the virtual static graphs necessary to output the requested portion are produced therefrom. If a different portion is subsequently requested, without otherwise modifying the edit, the same container can be employed to extract another set of virtual static graphs which can be used to produce the different requested portion. However, if the edit has been modified, the container will be reconstructed, as described below. In any event, in a present embodiment of the invention, container 100 is not persisted when a edit is saved.

Container 100 comprises source objects, effects objects, filter objects and time masks arranged in layers and further includes a database object for each layer, referred to herein as a layer multiplexer or layer mux, which maintains a record of the objects in the layer of the container whose outputs are available at any given time, the transition times for objects in the layer and in any immediately adjacent lower layer and maintains a per object database which indicates, for each object, the connections to and from the object and the times they are active. As will be apparent to those of skill in the art, a transition occurs when the state of an object changes, for example from an active state to an inactive state, or vice versa.

A set of constraints is defined for the interconnection of objects in media container 100, the constraints requiring that objects be arranged in layers. Specifically, under these constraints an object in a media container cannot receive input from another object in the same layer or from an object in a higher layer. Further, in the present embodiment of the invention an object cannot provide an output to an object in the same layer or to an object in a lower layer. Also, at the highest layer of a container 100 only a single output can be produced at any given time, although it is contemplated that this constraint can be waived, if desired, for particular applications of the present invention.

Finally, as mentioned above and discussed further below, transitions are propagated from lower layers to higher layers and thus, a higher layer can never have fewer transitions than a lower layer. In FIG. 4, these constraints require only a single layer, L0, in media container 100.

Figure 5:
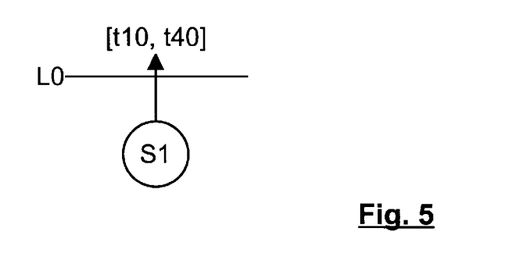
FIG. 5 shows a schematic representation of the duration of the media container of FIG. 4.

In FIG. 4, container 100 includes a single source clip S1, which has a time mask 104 applied to it from time t10 to t40, and a layer multiplexer 108. FIG. 5 shows a schematic view of media container 100. Layer multiplexer 108 includes indications of two transitions which define a duration from t10 to t40 wherein the output of S1 is available and also includes a database for the S1 source object which indicates that S1's output is available from t10 to t40.

Figure 6:
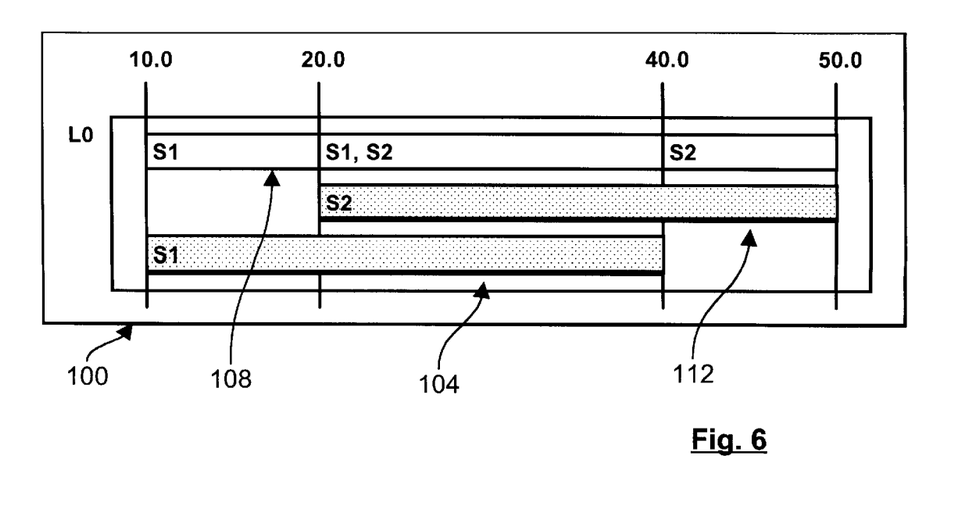
FIG. 6 shows the media container of FIG. 4 with an added second source.

FIG. 6 shows the media container of FIG. 4 wherein a second source, S2, as been added. Time mask 112 has been applied to the entire duration of source S2 and layer multiplexer 108 has been updated to include indications of transitions at t20 and t40 and shows that an output is available from S1 from t10 to t20, from S1 and S2 from t20 to t40 and from S2 from t40 to 50. Layer multiplexer 108 has also been updated to include a database for the S2 clip object which indicates that it's output is available from t20 to t50.

Figure 7:
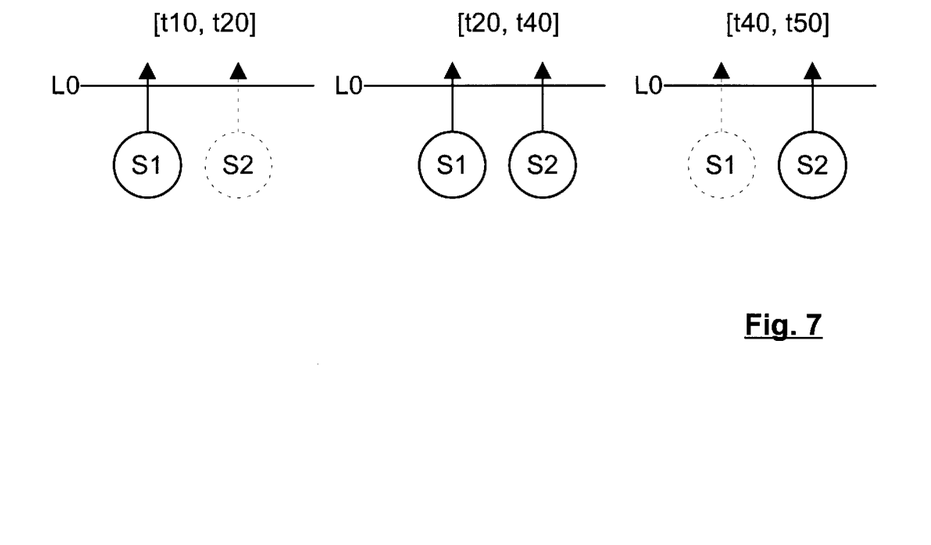
FIG. 7 shows schematic representations of the three durations of the media container of FIG. 6.

FIG. 7 shows a schematic view of media container 100 in FIG. 6, wherein the data elements which are not available to produce an output are shown with in broken line. Specifically, from time t10 to t20 source S2 is not available to produce an output and is shown in broken line, as is source S1 from time t40 to t50 when it is not available to produce an output.

Figure 8:
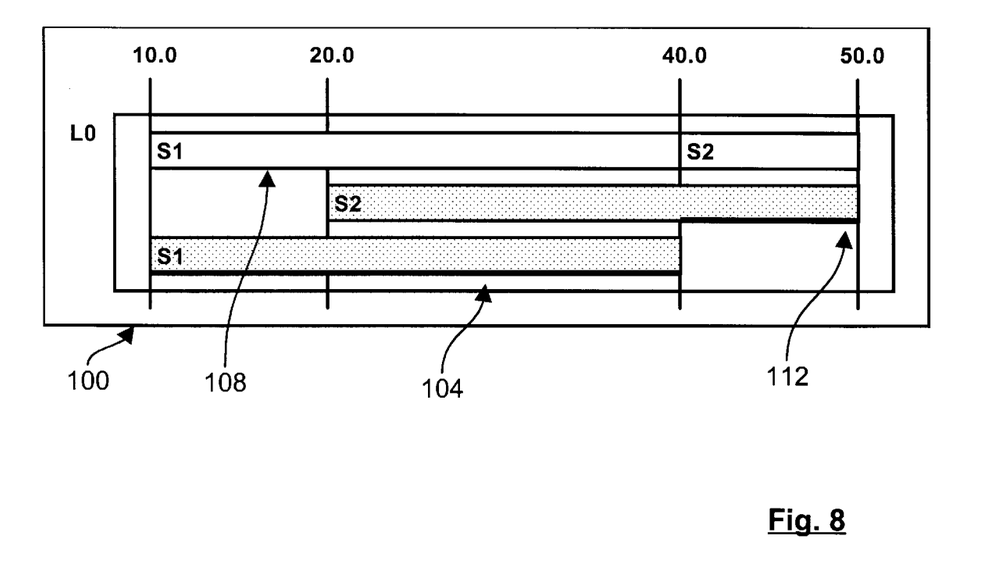
FIG. 8 shows the media container of FIG. 6 wherein a time mask has been adjusted.
Figure 9:
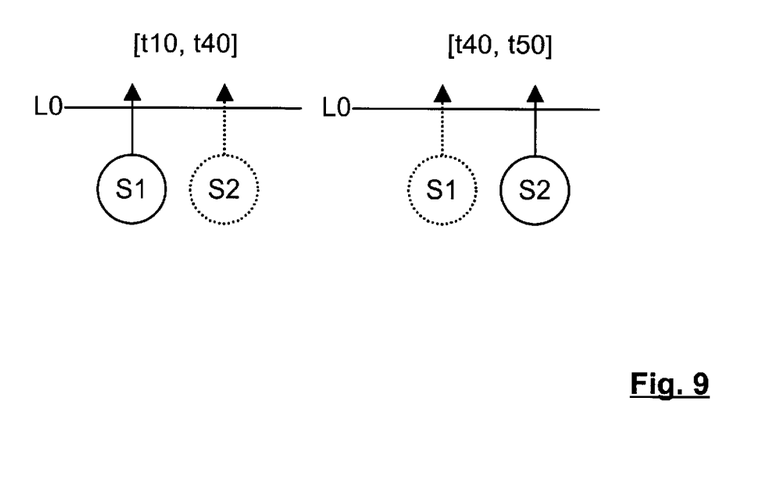
FIG. 9 shows schematic representations of the two durations of the media container of FIG. 8.

In fact, as described above, in a presently preferred embodiment of the invention, the topmost layer of a media container can only have a single output at any given time and thus, in FIG. 8 time mask 112 has been modified such that source S2 is only active from time t40 to t50 and layer multiplexer 108 has been updated accordingly. FIG. 9 shows an updated schematic view of FIG. 8.

Figure 10:
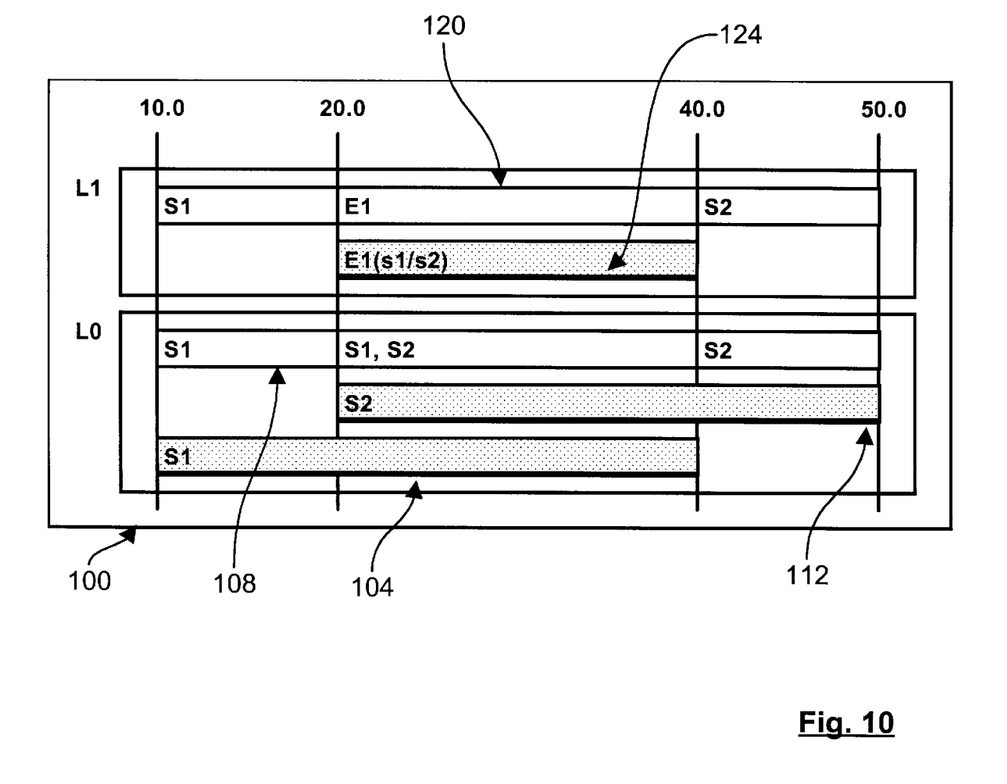
FIG. 10 shows the media container of FIG. 8 wherein an effect has been added.

In FIG. 10, a dissolve effect E1 has been added to media container 100. As E1 will require input from other items in media container 100, to comply with the abovementioned connection constraints, E1 is placed in a second layer, L1. When layer L1 is added, a second layer multiplexer 120 is created and updated accordingly.

For example, assume that the track edit constructed by the user of the NLE has E1 receiving input from sources S1 and S2, from t20 to t40 and performing a dissolve between them. As indicated by layer multiplexer 108 in FIG. 8, no output is available from source S2 from t20 to t40 and thus time mask 112 is updated, as shown in FIG. 10, to be applied to the full duration of S2, from t20 to t50. Further, a time mask 124 is applied to the full duration of E1 to activate it from t20 to t40. Layer multiplexer 120 is updated to indicate that an output is available from source S1 for t10 to t20, an output is available from effect E1 from t20 to t40 and an output is available from source S2 from t40 to t50. In particular a database is created for E1 which indicates the connection between E1 and S1 for t20 to t40 and between E1 and S2 for the same time. The databases for S1 and S2 are updated to indicate their respective connections to E1 as well.

Figure 11:
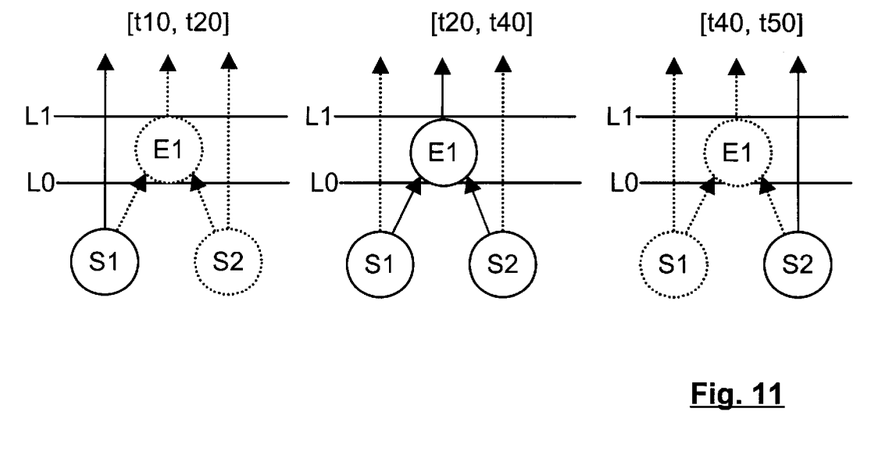
FIG. 11 shows schematic representations of the three durations of the media container of FIG. 10.

As will be apparent, and as mentioned above, layer L1 has but a single output in each duration and thus the above-mentioned constraints are met. Of course, layer L0 has two outputs from t20 to t40, but this is permitted as L0 is not the topmost layer. FIG. 11 shows the corresponding schematic representations.

Figure 12:
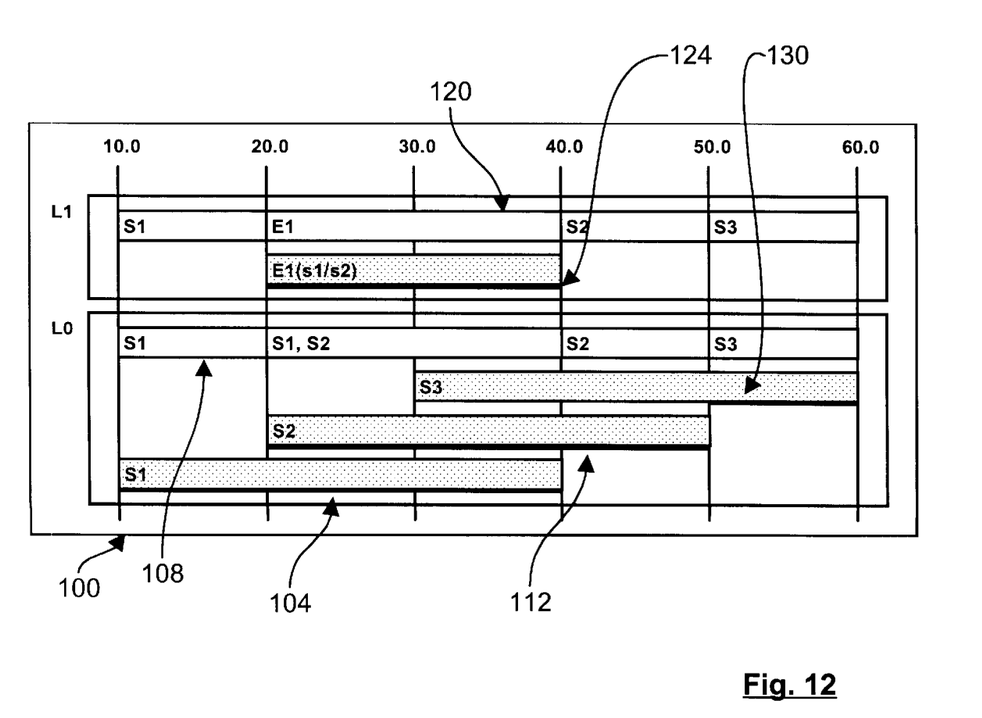
FIG. 12 shows the media container of FIG. 10 with an added third source.
Figure 13:
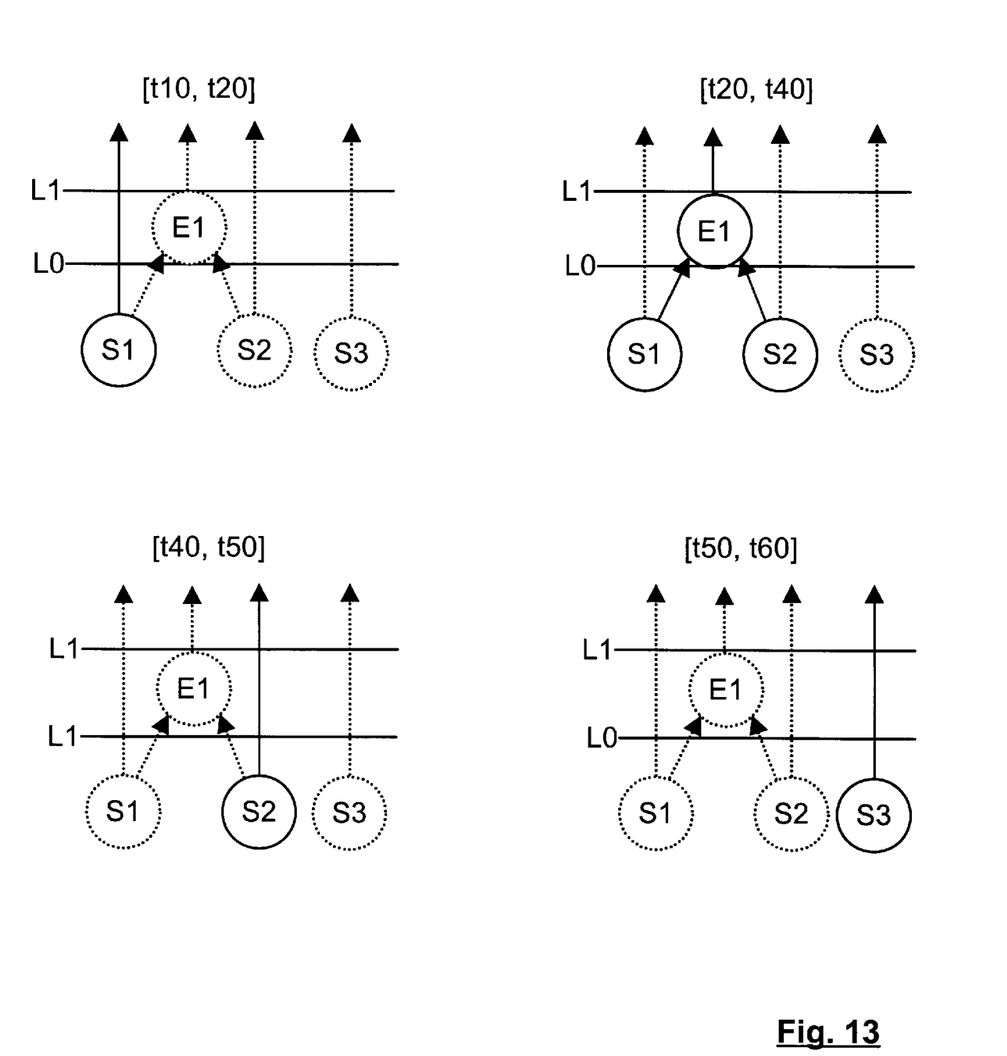
FIG. 13 shows schematic representations of four durations of the media container of FIG. 12.

FIG. 12 shows the media container of FIG. 10 wherein another source S3 has been added. Source S3 has been added to layer L0 and, in order to meet the single output constraint, a time mask 130 has only been applied for the duration t50 to t60. Layer multiplexer 108 and layer multiplexer 120 have been updated accordingly. FIG. 13 shows the corresponding schematic representation of the durations of media container 100. It should be noted that, as objects are added, removed or modified in container 100, creation and/or updating of media container 100 is performed in a bottom to top manner, with L0 being processed first, L1 next, etc.

Figure 14:
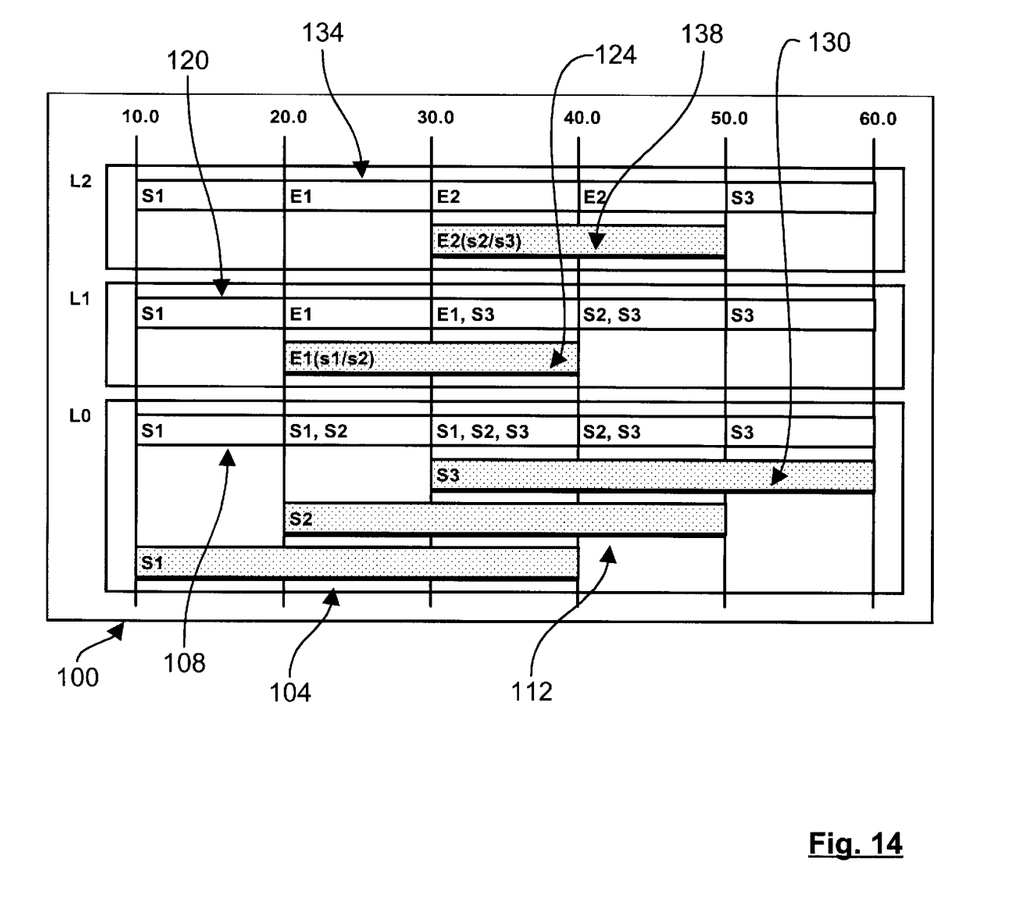
FIG. 14 shows the media container of FIG. 12 wherein a second effect has been added.

FIG. 14 shows media container 100 wherein a third layer, L2, has been added to receive a second effect E2 and a third layer multiplexer 134 has been created. E2 has been placed in L2 as E2 is active at the same time that E1 is active, specifically from t30 to t40, and thus E2 has been placed in L2 to meet the above-mentioned constraint that there only be a single output at the top layer of container 100. Further, it should be noted that layer multiplexer 120 shows two durations for E1, from t20 to t30 and from t30 to t40. This is due to the fact that, as mentioned above, transitions are propagated from lower layers to higher layers and, in fact a higher layer can never have fewer transitions than a lower layer. Thus, as there is a transition at t30 when S3 becomes active, this transition is propagated to layer multiplexer 120. Similarly, layer multiplexer 134 shows two durations for E2, from t30 to t40 and from t40 to t50, as E1 becomes inactive at t40 and this transition is propagated upwards to layer L2. In fact, the transition wherein E1 becomes inactive at t40 has been propagated up from L0 wherein S1 becomes inactive at t40.

As defined by the user of the NLE, effect E2 is to be active from t30 to t50 as indicated by time mask 138 and is to be fed with sources S2 and S3. As will be apparent from FIG. 14, S2 is not available to feed E2 from layer L1 as effect E1 is occluding S2, as indicated by layer multiplexer 120 which only shows outputs from E1 and S3 in t30 to t40. Thus, effect E2 employs what the present inventor refers to as an indirect connection and connects to E1 from t30 to t40 as an indirect connection to source S2 and connects directly to source S2 for t40 to t50.

As will apparent to those of skill in the art, indirect connections allow for the layering of effects and/or filters onto sources, the output from one effect or filter serving as the input to another. With an indirect connection, a feeder will connect to the closest object which is connected, directly or otherwise, to the specified object. While not employed in a presently preferred embodiment of the invention, a connection can also be specified as a direct connection wherein a connection will only be made directly to the specified object.

Figure 15:
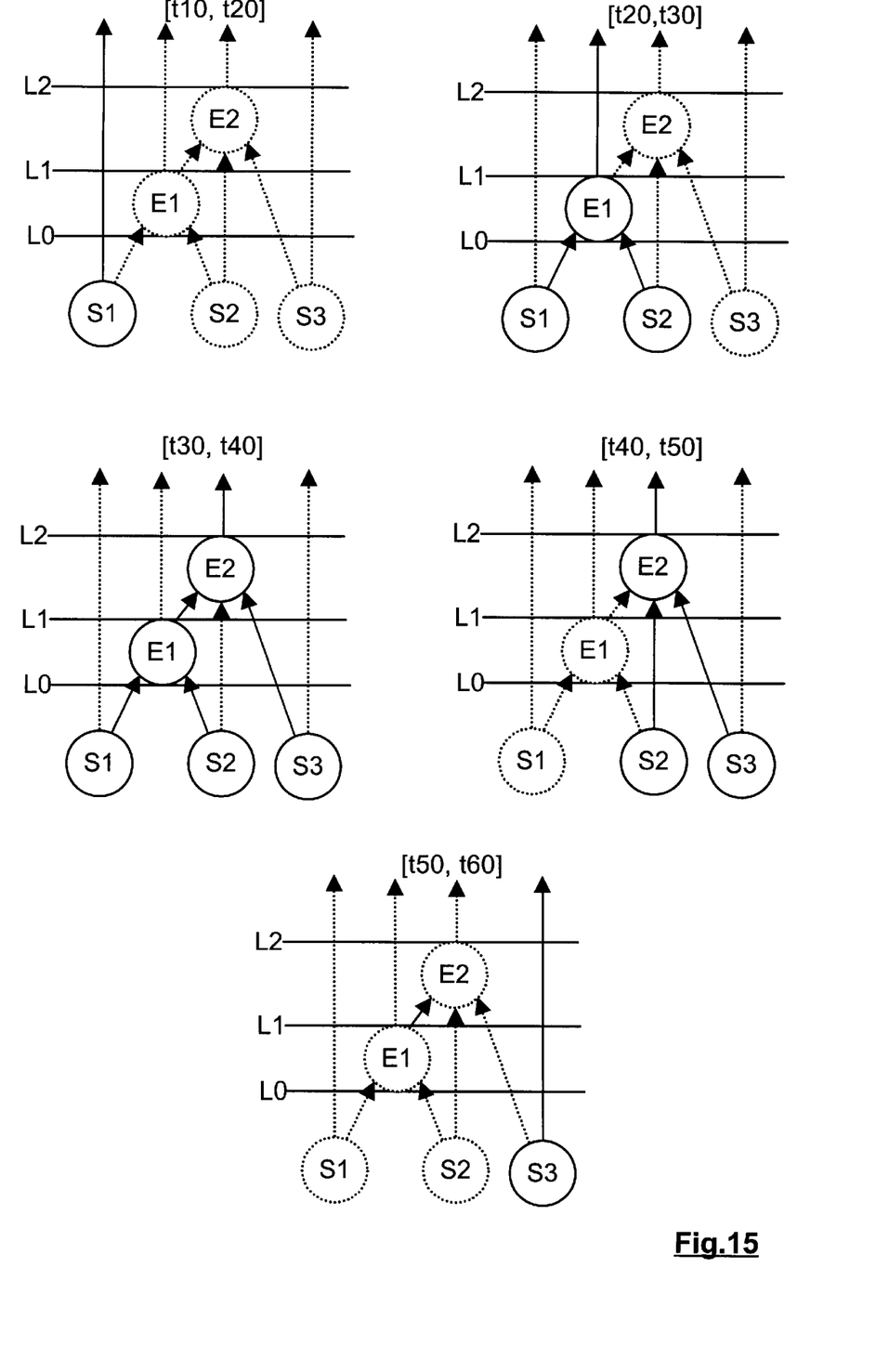
FIG. 15 shows schematic representations of the five durations of FIG. 14.

FIG. 15 shows the schematic representation of the five durations of media container 100 in FIG. 14. In the schematic for t30 to t40, it is important to note that the direct connection between E2 and S2 is not active, S2 is shown in solid line only because it is active to E1.

As will be apparent from the above, the process of creating a media container comprises the steps of:

(i) determining the data elements to be included in the container;

(ii) positioning each data element representing a data source in a first, bottom layer;

(iii) creating a minimal set of one or more higher layers in which other data elements are positioned, these other data elements being positioned such that they receive input only from data elements in a lower layer and that, if they provide an output to other data elements those data elements are located in a higher layer;

(iv) setting the current layer to be the lowest layer; and (v) for the current layer, creating a layer multiplexer containing an indication of each transition in the current layer and all transitions in the layer multiplexer of the adjacent lower layer, if any, each transition indicating the start and/or end of a duration and the layer multiplexer indicating the outputs available, if any, for each duration; and (vi) setting the current layer to be the next higher layer and repeating step (v) until a layer multiplexer has been created for all layers, the layer multiplexer for topmost layer including indications of all the transitions within the container.

The process of updating a media container comprises the steps of:

(i) ensuring that each data element is positioned within a layer such that any data elements which provide the data element under consideration with an input are in a lower layer and that any data element which the data element under consideration provides output to is in a higher later, moving data elements between layers and/or creating or removing layers as necessary; and (ii) for each layer in turn, commencing at the bottom layer and proceeding upwards to the top layer, updating the layer multiplexer to include an indication of each transition in the layer and in the layer multiplexer of the adjacent lower layer, if any, and the outputs, if any, available in each duration.

In fact, as will be apparent to those of skill in the art, the present invention permits incremental updating of existing media containers. Specifically, a modification to a layer, or layers, only necessitates updating of the lowest modified layer and the layers above. In a more complex case, improved incremental updating of media containers can be accomplished by considering, in the bottom most layer in which a modification occurred and layers above, the total duration within which the modifications have been made and those durations after it.

Virtual static graphs are formed from media containers by examining the container. Specifically, the examination of the container to form virtual static graphs comprises the following steps wherein the required outputs within a requested portion of an edit are determined and the layer multiplexers and the per object databases in the layer multiplexers are examined to determine the required connections, the availability of the outputs and/or the data elements which provide inputs to the required outputs.

First, the desired output portion of media container is specified. Next, a determination is made of each duration of the media container within the specified portion. The transition times wherein each duration starts and ends within a media container are noted and, in media container 100 of FIG. 14 and assuming a specified portion of from t10 to t60, these transition times are located at t10, t20, t30, t40, t50 and t60, defining five durations.

Next, at each transition time the required output data element is determined by examining the topmost layer multiplexer to determine the required output data element (if any) for each duration. In FIG. 14, from layer multiplexer 134, the required data elements are: S1 for t10 to t20; E1 for t20 to t30; E2 for t30 to t40; E2 for t40 to t50; and S3 for t50 to t60.

Figure 16A:
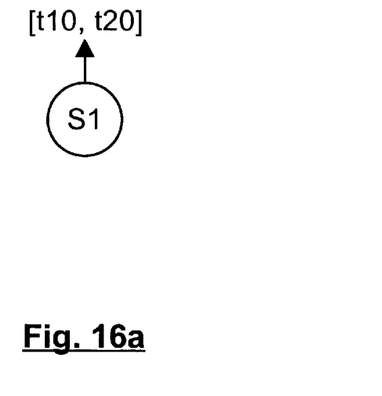
FIGS. 16a through 16e show virtual static graphs corresponding to each of the five durations of FIG. 14.
Figure 16B:
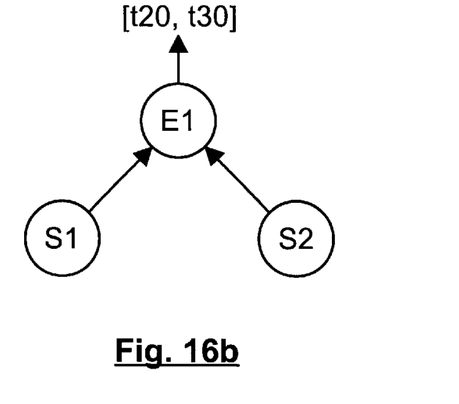
Figure 16C:
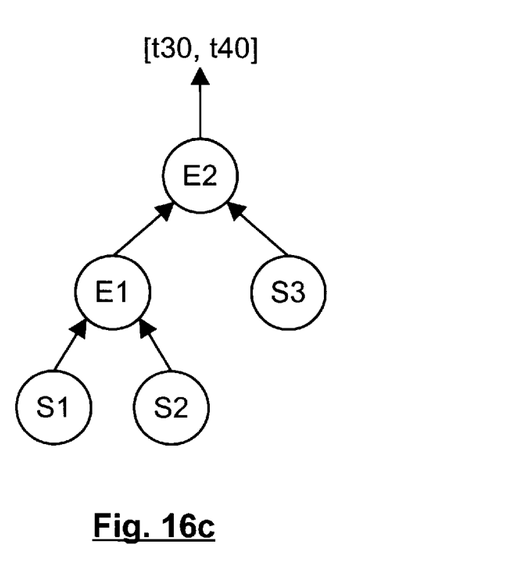

Next, if a duration's required output data element is a source element, a virtual static graph comprising the source element is produced. As S1 and S3 are source data elements, the virtual static graphs for t10 to t20 and t50 to t60 are produced as shown in FIGS. 16a and 16c, respectively.

If the duration's required output data element is not a source data element, a determination is made from the per object database as to the connections required by the object within a duration. Next a determination is made as to whether the data element or elements which provide input to the required output data element are available. The determination commences by examining the layer multiplexer of the layer below and, if the required inputs are not present in that layer multiplexer, proceeding to each lower layer multiplexer in turn until each input is identified. In the case of a data element permitting indirect connections, the data elements in each lower layer are examined, in turn, to determine if they receive the required input as an input. If this is the case, the intervening data element's output is used as the input to the required output data element.

For example, E1 requires input from S1 and S2 and, from layer multiplexer 120 of L1 in FIG. 14, a determination is made that S1 and S2 are not available at layer L1 for t20 to t30. From layer multiplexer 108, it is determined that source data elements S1 and S2 are available in layer L0. A virtual static graph produced for t20 to t30 is shown in FIG. 16b.

For t30 to t40, the required output data element is E2 which is not a source data element and which receives input from S2 and S3. Accordingly, layer multiplexer 120 is examined to determine if S2 and S3 are available. From layer multiplexer 120, it is determined that for t30 to t40, E1 and S3 are available. If E2's inputs are defined as direct connection, no virtual static graph will be output for t30 to t40 as S2 is not directly available. However, in this example E2 has been defined as permitting indirect connections and thus an examination is made of E1. It is determined that one of E1's inputs is S2 and thus E1 is supplied to E2, along with S3. The resulting virtual static graph produced for t30 to t40 is shown in FIG. 16c.

Figure 16D:
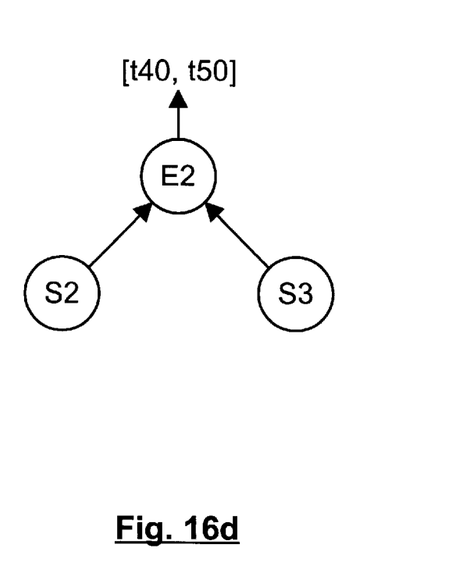
Figure 16E:
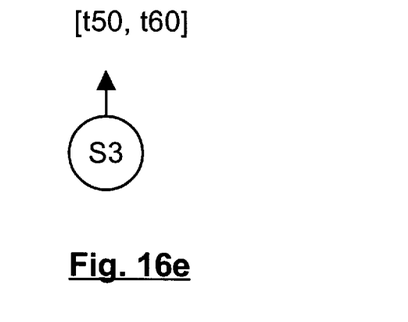

For t40 to t50, the required output data element is still E2. However, from examining layer multiplexer 120 for this duration, it is apparent that S2 is directly available as an input to E2. The resulting virtual static graph produced for this duration is shown in FIG. 16d.

The present invention allows for an effective and efficient representation and use of complex unidirectional data such as NLE edits and the like. When it is desired to render an edit represented by a portion of such data, the present invention produces the minimal set of data for the requested portion, allowing efficient processing of the data.

The above-described embodiments of the invention are intended to be examples of the present invention and alterations and modifications may be effected thereto, by those of skill in the art, without departing from the scope of the invention which is defined solely by the claims appended hereto.

I claim:

1. A system for representing an arrangement of hierarchical time-based data elements, whose state can change between active and inactive states with time and wherein interconnections between said data elements can also change with time, and for extracting information from a specified time portion of said arrangement, comprising:

a container having at least one layer in which at least one of said data elements can be placed, each said at least one layer being arranged in a hierarchy;

means to arrange said data elements within said layers of said container such that any data element which is to receive data from an other element is represented in a higher layer than that of said other data element and any data element which is to provide an output to an other data element is in a lower layer than that of said other data element;

a database for each said at least one layer of said container, each said database including an indication of each duration in said layer, a duration being defined as the time period between adjacent state changes of any data element placed in said corresponding layer or any data element placed in an immediately adjacent lower layer in said hierarchy and each said database further including an indication of the connections to and from each said data element in said corresponding layer during each said duration;

means to examine said container to determine the durations occurring within said specified time portion;

means to determine those data elements which are in an active state for each said determined duration and their interconnections within each said determined duration; and means to output a representation of the determined data elements and their interconnections within said specified time portion.

2. The system of claim 1 wherein said means to output a representation outputs a data structure representing a virtual static graph for each duration of said requested time portion, each said virtual static graph indicating said data elements that are in the active state in said duration and their interconnections.

3. The system of claim 1 wherein the state of each said data element is indicated by a time mask applied to each said data element.

4. The system of claim 1 further comprising means to specify, for each data element receiving input from an other data element, whether said data element requires a direct connection to said other data element or whether said data element can employ an indirect connections to said other data element via at least a third data element connected to said other data element.

5. The system of claim 1 wherein, upon modification of the contents of a first layer of said container, said means to arrange said data elements within said layers reprocesses said first layer and each higher layer in said hierarchy and each said corresponding database is updated to reflect said modification.

6. An article of manufacture including a computer usable medium having computer readable program code means embodied therein for operating a computer to construct, modify or play an NLE edit track composed of hierarchical time-based data elements whose state can change between active and inactive states with time and wherein interconnections between said data elements can also change with time, comprising:

computer readable code means for causing a computer to determine the data elements to be represented in said NLE edit track;

computer readable code means for causing a computer to create a container to represent the states and hierarchy of said determined data elements;

computer readable code means for causing a computer to place each data element which receives no input from other data elements in a first, bottom layer of said container, and to position each said data element with respect to a time line and indicate when each said data element is active and inactive;

computer readable code means for causing a computer to create a minimal set of one or more higher layers in which other data elements to be represented are placed, indicate when each said other data elements are active and inactive, said other data elements being placed such that they receive input only from data elements in a lower layer and that, if they provide an output to other data elements, those data elements are located in a higher layer;

computer readable code means for causing a computer to, for each layer in turn in said container, from the bottom layer to the top layer, examine the data elements in the layer to determine the transitions wherein each data element in the layer and in any adjacent lower layer changes between states;

computer readable code means for causing a computer to create for each layer a layer multiplexer to indicate each output from a data element which is available in each duration between determined transitions;

computer readable code means for causing a computer to examine the topmost layer of said container to determine for each duration in said container the outputs required for each duration and the data elements which provide said identified outputs;

computer readable code means for causing a computer to, for each data element which requires input from another data element, examine the layer multiplexers in lower layers to determine the other data elements which provide the required input; and computer readable code means for causing a computer to, in response to a request for active data elements and their interconnections within a specified portion of time represented within said container, output a representation of said active data elements a representation of their interconnections for each duration within said portion of time.

7. An article of manufacture including a computer usable medium having computer readable program code means embodied therein for operating a computer to construct, modify or play at least a specified time portion of an NLE edit track composed of hierarchical time-based data elements whose state can change between active and inactive states with time and wherein interconnections between said data elements can also change with time, comprising:

computer readable code means for causing a computer to construct a container having at least one layer in which at least one of said data elements can be placed, each said at least one layer being arranged in a hierarchy;

computer readable code means for causing a computer to arrange said data elements within said layers of said container such that any data element which is to receive data from an other element is represented in a higher layer than that of said other data element and any data element which is to provide an output to an other data element is in a lower layer than that of said other data element;

computer readable code means for causing a computer to construct a database for each said at least one layer of said container, each said database including an indication of each duration in said layer, a duration being defined as the time period between adjacent state changes of any data element placed in said corresponding layer or any data element placed in an immediately adjacent lower layer in said hierarchy and each said database further including an indication of the connections to and from each said data element in said corresponding layer during each said duration;

computer readable code means for causing a computer to examine said container to determine the durations occurring within said specified time portion;

computer readable code means for causing a computer to determine those data elements which are in an active state for each said determined duration and their interconnections within each said determined duration; and computer readable code means for causing a computer to output a representation of the determined data elements and their interconnections within said specified time portion.

* * * * *